United States Patent

[11] 3,618,923

| [72] | Inventor | Lloyd Richard Michels<br>San Jose, Calif. |
|---|---|---|
| [21] | Appl. No. | 852,565 |
| [22] | Filed | Aug. 25, 1969 |
| [45] | Patented | Nov. 9, 1971 |
| [73] | Assignee | The United States of America as represented by the United States Atomic Energy Commission |

[54] APPARATUS FOR THE DISTILLATION OF POLONIUM FROM BISMUTH
4 Claims, 4 Drawing Figs.

[52] U.S. Cl. .................................................. 266/16, 75/63, 203/91
[51] Int. Cl. ..................................................... C21c 5/38, C22b 7/00
[50] Field of Search .......................................... 202/185 R, 185 C, 185 D, 185 E, 238, 205; 203/94, 98, 91; 159/34; 75/63, 88, 84, 84.5; 266/15, 16, 19

[56] References Cited
UNITED STATES PATENTS

| 2,271,023 | 1/1942 | Nelson | 75/63 X |
|---|---|---|---|
| 2,351,489 | 6/1944 | Cooper | 75/67 X |
| 2,375,199 | 5/1945 | Alexander | 75/63 X |
| 2,404,328 | 7/1946 | Turin et al. | 266/15 |
| 2,422,967 | 6/1947 | Isbell | 266/37 |
| 2,720,456 | 10/1955 | Davey | 75/63 X |
| 2,823,111 | 2/1958 | Davey et al. | 75/88 |
| 3,031,296 | 4/1962 | Davey | 75/63 X |
| 3,080,227 | 3/1963 | Woods et al. | 75/63 |
| 3,136,627 | 6/1964 | Caldwell, Jr. et al. | 75/63 |
| 3,220,827 | 11/1965 | Davey et al. | 266/15 X |

FOREIGN PATENTS

| 543,370 | 2/1942 | Great Britain | 266/19 |

Primary Examiner—Norman Yudkoff
Assistant Examiner—J. Sofer
Attorney—Roland A. Anderson ABSTRACT: Polonium is distilled from bismuth under vacuum in a pot provided with a cover carrying a condenser which is positioned inside the pot. The condenser is filled with a liquid metal heat transfer medium in which heating elements and cooling elements are immersed. During distillation, the condenser is cooled and polonium freezes on it. The vacuum is then broken and the cover, with the attached condenser, is removed and carried to a receptacle, which may be another still pot. The condenser is then heated, melting the polonium. The polonium may be redistilled any desired number of times and further purified by chemical separation and/or solvent extraction. The apparatus may be used for the distillation of other metals.

Inventor
Lloyd R. Michels

Inventor
Lloyd R. Michels
Roland A. Anderson
Attorney

3,618,923

APPARATUS FOR THE DISTILLATION OF POLONIUM FROM BISMUTH

CONTRACTUAL ORIGIN OF THE INVENTION

This invention was made in the course of or under a contract with the U.S. Atomic Energy Commission.

BACKGROUND

Polonium is a radioactive element which is valuable in space power applications because of its high rate of heat generation (141 watts per gram) coupled with its relatively low shielding requirements. It is produced by irradiating bismuth with thermal neutrons in a nuclear reactor. It has been the practice to separate the polonium from the bismuth by chemical processes in which the bismuth is not recovered.

Laboratory work by others has shown that polonium can be separated from bismuth by vacuum distillation.

By distilling off the polonium, the bismuth can be recovered in metallic form, suitable for recycling to the reactor. The polonium can be purified by further treatment.

SUMMARY OF INVENTION

I have devised a method and apparatus for the distillation of polonium from bismuth on a production scale. The irradiated bismuth metal containing polonium is placed in a pot equipped with means for heating it to the necessary temperature. The pot is provided with a tightly fitting removable cover which is provided with a connection to a vacuum line. The cover also carries a condenser positioned within the pot. The condenser is provided with means for cooling it and also with means for heating it internally.

A charge of irradiated bismuth containing polonium is placed in the pot, the cover is affixed, and the pot evacuated. The pot is then heated while cooling water is circulated through the condenser. A mixture of polonium and bismuth, enriched in polonium as compared to the original charge, is vaporized and freezes on the condenser, while bismuth remains as liquid in the pot. The vacuum is broken by the introduction of argon. The cover, with the attached condenser, is removed and is utilized to move the polonium to another receptacle, which after the first stage of distillation will normally be another still pot.

The condenser is now heated internally, melting the condensate, preferably in an atmosphere of argon or other inert gas.

The operation may be repeated to further concentrate the polonium before it is subjected to chemical purification.

The apparatus is suitable for the distillation of other low-boiling metals, such as magnesium or zinc.

DETAILED DESCRIPTION

Figure 1:
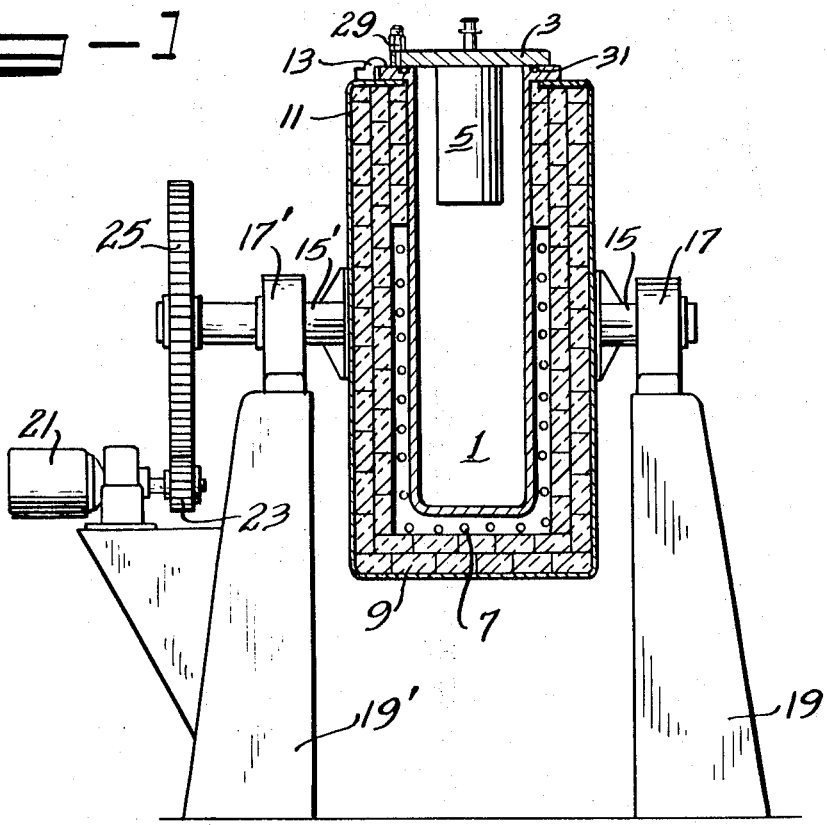
FIG. 1 is an elevation, partially in sections, of my distillation apparatus.
Figure 2:
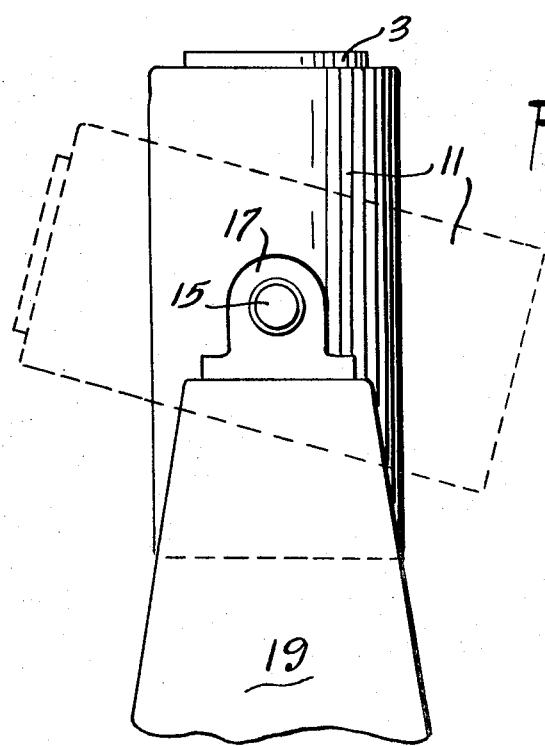
FIG. 2 is an end view of the apparatus shown in FIG. 1.

Referring to FIGS. 1 and 2 of the drawings, the distillation equipment includes a still pot 1. The pot is closed by a cover 3 which carries a condenser 5. The cover and condenser will be described in more detail later. The pot 1 is heated by an electrical heater 7 which is enclosed in fire brick insulation 9. The elements thus far described are surrounded by a shell 11, the pot being held in place by clamps 13. The shell is mounted on trunnions 15, 15' which are journaled in bearings 17, 17'. The bearings in turn are mounted on piers 19, 19'. Shell 11 can be tilted to various positions by motor 21 through pinion 23 and gear 25.

FIG. 2 shows the shell in the upright position in solid lines and in a tilted position in dotted lines.

Figure 3:
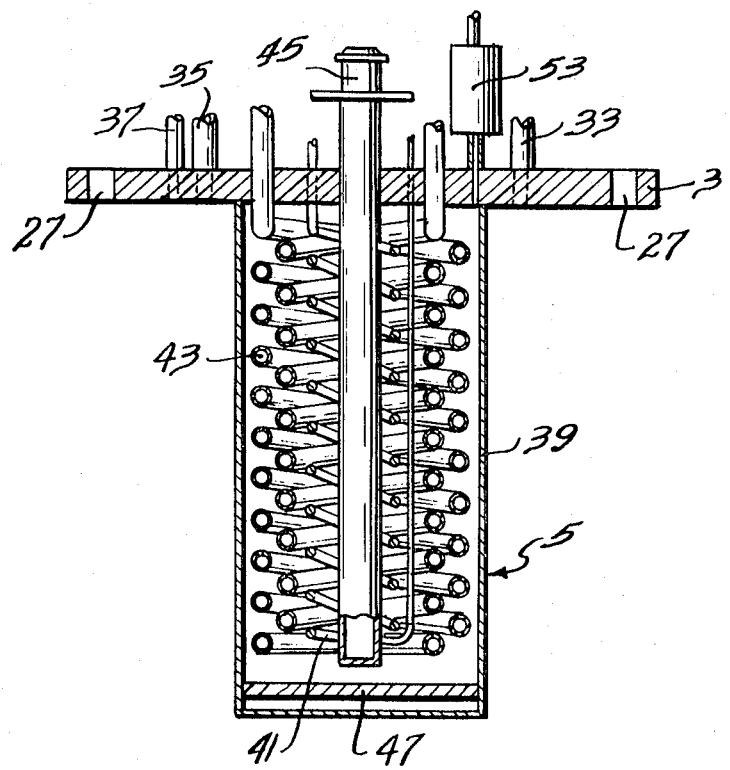
FIG. 3 is a section through the cover-condensor unit of FIG. 1.
Figure 4:
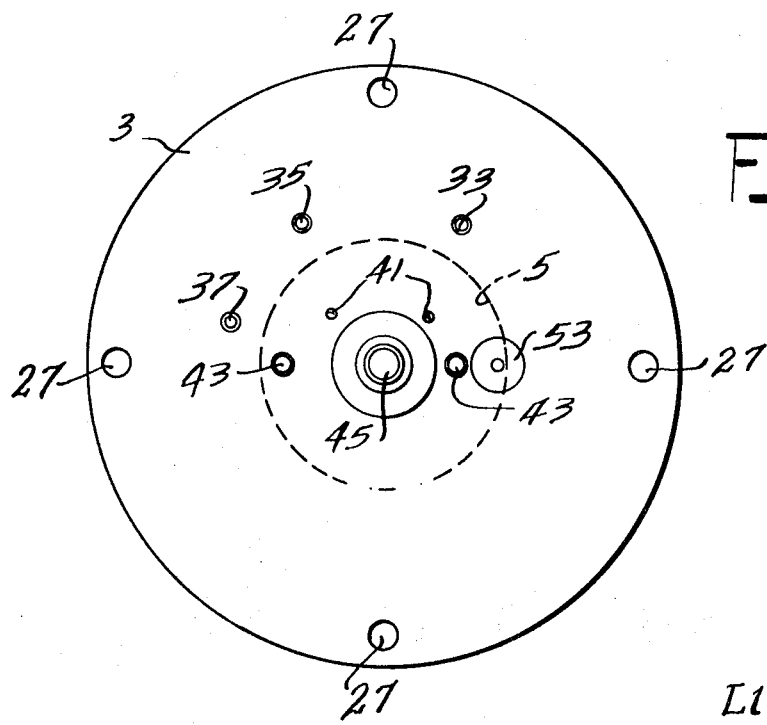
FIG. 4 is a plan view of the structure shown in FIG. 3.

Cover 3 and condenser 5 will now be described with reference to FIGS. 1, 3 and 4.

Cover 3 is a circular plate provided with holes 27 for studs 29 which clamp it to pot 1. An O-ring 31 provides a tight seal between the cover and the pot.

Cover 3 also carries connectors 33 for a vacuum line, 35 for a source of argon and 37 for a pressure reference line which communicate with the interior of pot 1.

Condenser 5 carried by cover 3 comprises a shell 39 within which are an electrical heating element 41 and a cooling coil 43 through which water is circulated as shown by arrows.

A thermowell 45 receives a thermometer (not shown). A thermal radiation shield 47 is also provided.

The shell 39 is filled with a liquid metal 51, e.g., sodium-potassium alloy. An expansion chamber 53 provides for changes in volume of the liquid metal. The liquid metal acts as a heat transfer medium and makes it possible to both heat and cool shell 39 efficiently.

OPERATION

Slugs of irradiated bismuth containing polonium are placed in still pot 1 which is then evacuated to a pressure of the order of 0.01 to 10 mm.Hg. It is flushed with argon and evacuated again. The still pot is then heated by heaters 7 to a temperature in the range of about 450°–900° C. while condenser 5 is chilled by circulating water through cooling coil 43. A condensate enriched in polonium solidifies on the condenser.

Distillation conditions in my apparatus approximate what is known as "short path nonequilibrium distillation." In this type of distillation, it is desirable that a large surface of the distillant be exposed. It is, therefore, advantageous to tilt the still during distillation, as shown in dotted lines in FIG. 2. Uniform temperature over the condenser surface is also desirable and is attained by the use of the liquid metal heat transfer medium.

After a period of time determined by experience, heating coil 7 is turned off and the vacuum is broken by introducing argon. The cover 3, carrying condenser 5 and the solidified condensate, is then removed and carried to another still of similar design. Heat is now applied through heater 41 melting the condensate so that it drops into the second still. Preferably the still is flushed with argon during this operation to avoid oxidation.

Here the distillation process is repeated, further concentrating the polonium. The original cover may be used on this second still or a clean cover may be employed while the first cover is returned to the first still which has meanwhile been emptied by tilting the still on trunnions 15, 15' and pouring out the molten bismuth, and refilled with a second charge.

On subsequent distillations, the bismuth-containing residue from the second still is recycled to the first still.

The polonium may be further purified by chemical separation, solvent extraction or a combination of those processes.

While I have described the operation of the apparatus in connection with the distillation of polonium, it is also suitable for the distillation of other low-melting metals such as magnesium, calcium or zinc.

The embodiments of the invention in which an exclusive property or privilege is claimed are defined as follows:

1. Apparatus for the distillation of metals comprising a still pot, means for heating said still pot, a cover closing said still pot and removable therefrom, a condenser mounted on the inside of said cover and extending into said still pot, said condenser comprising a shell, liquid metal filling said shell, and heating and cooling elements immersed in said liquid metal.

2. Apparatus as defined in claim 1 wherein the heating means immersed in said liquid metal is an electrical resistance heater and said cooling means is a conduit for fluid.

3. Apparatus as defined in claim 1 and further comprising means for evacuating said still pot.

4. Apparatus as defined in claim 3 wherein said still pot is an elongated cylinder mounted for rotation about an axis transverse to its own axis, and further comprising means to tilt said still pot to various positions.